US008875946B2

(12) United States Patent
Muller

(10) Patent No.: US 8,875,946 B2
(45) Date of Patent: Nov. 4, 2014

(54) FLUID DISPENSER

(75) Inventor: Patrick Muller, Saint Aubin sur Gaillon (FR)

(73) Assignee: Aptar France SAS, Le Neubourg (FR)

( * ) Notice: Subject to any disclaimer, the term of this patent is extended or adjusted under 35 U.S.C. 154(b) by 0 days.

(21) Appl. No.: 13/468,699

(22) Filed: May 10, 2012

(65) Prior Publication Data

US 2012/0285991 A1 Nov. 15, 2012

Related U.S. Application Data

(60) Provisional application No. 61/498,868, filed on Jun. 20, 2011.

(30) Foreign Application Priority Data

May 13, 2011 (FR) .................................... 11 54179

(51) Int. Cl.

*B65D 5/66* (2006.01)
*B05B 11/00* (2006.01)
*B05B 15/00* (2006.01)

(52) U.S. Cl.

CPC ............ *B05B 15/00* (2013.01); *B05B 11/3001* (2013.01); *B05B 11/30* (2013.01); *G05B 11/3049* (2013.01)

USPC .................... 222/113; 222/321.7; 222/321.9; 222/154; 222/402.1; 362/96

(58) Field of Classification Search

USPC .............. 222/113, 192, 1, 321.7, 321.9, 380, 222/154, 156, 158, 402.1; 362/101, 555, 96

See application file for complete search history.

(56) References Cited

U.S. PATENT DOCUMENTS

| | | | | |
|---|---|---|---|---|
| 4,151,911 | A * | 5/1979 | Klingaman | 206/229 |
| 5,928,607 | A * | 7/1999 | Frisk | 422/29 |
| 6,045,813 | A * | 4/2000 | Ferguson et al. | 424/401 |
| 6,119,897 | A * | 9/2000 | Boileau | 222/78 |
| 6,415,959 | B1 * | 7/2002 | Bougamont et al. | 222/159 |
| 6,769,631 | B2 * | 8/2004 | Brown | 239/289 |
| 8,210,395 | B1 * | 7/2012 | Morris | 222/113 |
| 2004/0218402 | A1 * | 11/2004 | Jao | 362/555 |
| 2005/0167445 | A1 * | 8/2005 | Mochiachvili et al. | 222/113 |
| 2006/0076370 | A1 * | 4/2006 | Etesse | 222/494 |
| 2006/0250795 | A1 * | 11/2006 | Langone | 362/253 |
| 2007/0080168 | A1 * | 4/2007 | Kroub | 222/113 |
| 2009/0053331 | A1 * | 2/2009 | Cook | 424/725 |
| 2009/0145925 | A1 * | 6/2009 | Wegelin | 222/113 |
| 2010/0176154 | A1 * | 7/2010 | Whitcombe | 222/113 |
| 2010/0213212 | A1 * | 8/2010 | Custodis | 222/113 |
| 2011/0188229 | A1 | 8/2011 | Hernandez | |
| 2011/0284123 | A1 * | 11/2011 | Bouix et al. | 141/23 |

FOREIGN PATENT DOCUMENTS

| | | |
|---|---|---|
| WO | 2004/023850 A2 | 3/2004 |
| WO | 2010/030153 A1 | 3/2010 |

* cited by examiner

*Primary Examiner* — Frederick C Nicolas
*Assistant Examiner* — Bob Zadeh
(74) *Attorney, Agent, or Firm* — Sughrue Mion, PLLC

(57) ABSTRACT

A fluid dispenser including a fluid reservoir with a neck defining an opening, a dispenser member, such as a pump or a valve, having a body held in stationary manner in the opening of the reservoir and defining an annular gap between the neck and the body; and a source of radiation disposed in the annular gap.

18 Claims, 3 Drawing Sheets

FLUID DISPENSER

CROSS REFERENCE TO RELATED APPLICATION

This application claims the benefit under 35 U.S.C. §119 (e) of U.S. provisional patent application Ser. No. 61/498,868, filed Jun. 20, 2011, and priority under 35 U.S.C. §119 (a)-(d) of French patent application No. FR-11 54179, filed May 13, 2011.

TECHNICAL FIELD

The present invention relates to a fluid dispenser comprising a reservoir having a neck defining an opening, and a dispenser member, such as a pump or a valve, having a body that is held in stationary manner in the opening of the reservoir. Advantageous fields of application of the present invention are the fields of perfumery, cosmetics, or even pharmacy.

BACKGROUND OF THE INVENTION

In the prior art, US document No. 2010/0213212 is already known, which describes a fluid dispenser including a plurality of light sources that are oriented towards the reservoir or towards the dispensed fluid. The light sources are configured to be activated for a predetermined period of time when the dispenser is actuated. The fluid is dispensed by means of a piezoelectric, thermoelectric, or even electrostatic generator. Consequently, the dispenser is entirely electronic, given that the fluid is not dispensed by means of a conventional valve or a pump that is actuated manually by means of a pusher serving to vary the volume of a fluid chamber defined inside the body of the pump or of the valve. The provision of light sources associated with a power generator makes that dispenser an assembly that is entirely electrical.

In the prior art, document WO 2005/095003 is also known, which describes a dispenser head incorporating a light source that is disposed on the bottom face of the head so as to illuminate the container and its contents. That document does not indicate how the dispenser head is associated with a dispenser member of the pump or valve type that makes it possible to take and dispense the fluid.

Document FR 2 927 068 is also known, which describes a dispenser device incorporating irradiation means that are disposed on the fluid passage in such a manner as to irradiate the fluid. More precisely, the irradiation means are disposed in a pusher in the proximity of the dispenser orifice. The purpose of the irradiation is to modify the properties of the dispensed fluid.

Those prior-art documents describe concepts that are very theoretical, the practical implementation of which turns out to be extremely complicated.

BRIEF SUMMARY OF THE INVENTION

An object of the present invention is to remedy the above-mentioned drawback of the prior art by defining a fluid dispenser that incorporates a source of radiation, of irradiation, or of light in a manner that is very practical and that is extremely simple to implement. An object of the present invention is to associate, in ingenious and realistic manner, a source of radiation with a conventional dispenser member of the pump or valve type.

To do this, the present invention proposes a fluid dispenser comprising: a fluid reservoir including a neck defining an opening; and a dispenser member, such as a pump or a valve, including a body that is held in stationary manner in the opening of the reservoir, defining an annular gap between the neck and the body; at least one source of radiation being disposed in the annular gap. Thus, the source of radiation is positioned in particularly judicious manner, given that it may radiate in any direction, namely: downwards towards the reservoir; radially outwards through the neck of the reservoir; radially inwards towards the body of the dispenser member; or even upwards out from the opening of the neck towards the pusher. It can thus be said that the position of the source of radiation is central. In addition, it is particularly well protected between the neck and the body of the dispenser member: specifically, the annular gap E is not normally accessible to the user, in particular when the dispenser member is mounted in permanent manner on the neck of the reservoir, as it often is. It should also be observed that the annular gap E is a location that is not very visible in a dispenser, given that it is surrounded by the neck and the fastener means. A conventional dispenser does not need to be specially adapted in order to position the source of radiation, given that the annular gap E is not normally used.

In an embodiment, the source of radiation is secured to the body of the dispenser member. In a variant, the source of radiation is secured to the neck of the reservoir. In still another variant, the dispenser member includes fastener means for holding the body in the opening of the reservoir, the source of radiation being secured to the fastener means. When the fastener means include a neck gasket, it is also possible to associate the source of radiation with the neck gasket.

In a particularly practical aspect of the present invention, the source of radiation is mounted in a sleeve that is engaged in the opening of the neck, around the body of the dispenser member. The sleeve may be secured to the neck, the body, the neck gasket, or even the fastener means. The sleeve thus serves as a support for the source of radiation and for associated components, such as a power-supply battery or possibly an electronic circuit. By way of example, the sleeve may be force-fitted around the body of the dispenser member or in the neck of the reservoir.

According to an advantageous characteristic of the invention, the body of the dispenser member is transparent or translucent to the radiation from the source of radiation, the body defining a fluid chamber that is subjected to the radiation from the source of radiation, through the body. Thus, it is possible to irradiate the fluid contained in the fluid chamber, e.g. so as to modify its properties or even stabilize them. Quite simply, it may be advantageous to illuminate the fluid contained inside the chamber.

In addition to the body of the dispenser member, other component elements of the dispenser may be transparent or translucent to the radiation from the source of radiation, e.g. such as the fastener means, the neck of the container, or even the container in its entirety. The component elements may be partially, locally, or entirely transparent or translucent to the radiation from the source of radiation. Thus, The source of radiation may irradiate in any desired direction, whether it be towards the container, towards the neck of the container, towards the body of the dispenser member, or even upwards out from the opening, e.g. so as to illuminate a pusher mounted on the dispenser member.

The spirit of the invention resides in the apt, easy, and safe positioning of one or more sources of radiation inside the reservoir, around the body of the dispenser member that co-operates with the neck to form a favorable annular gap. Even if the source of radiation is positioned below the neck, around the body of the dispenser member, in the context of the invention, it is considered that it is disposed in the annular gap E.

BRIEF DESCRIPTION OF THE DRAWINGS

The invention is described more fully below with reference to the accompanying drawings, which show several embodiments of the invention by way of non-limiting example.

In the figures.

DETAILED DESCRIPTION

Figure 1:
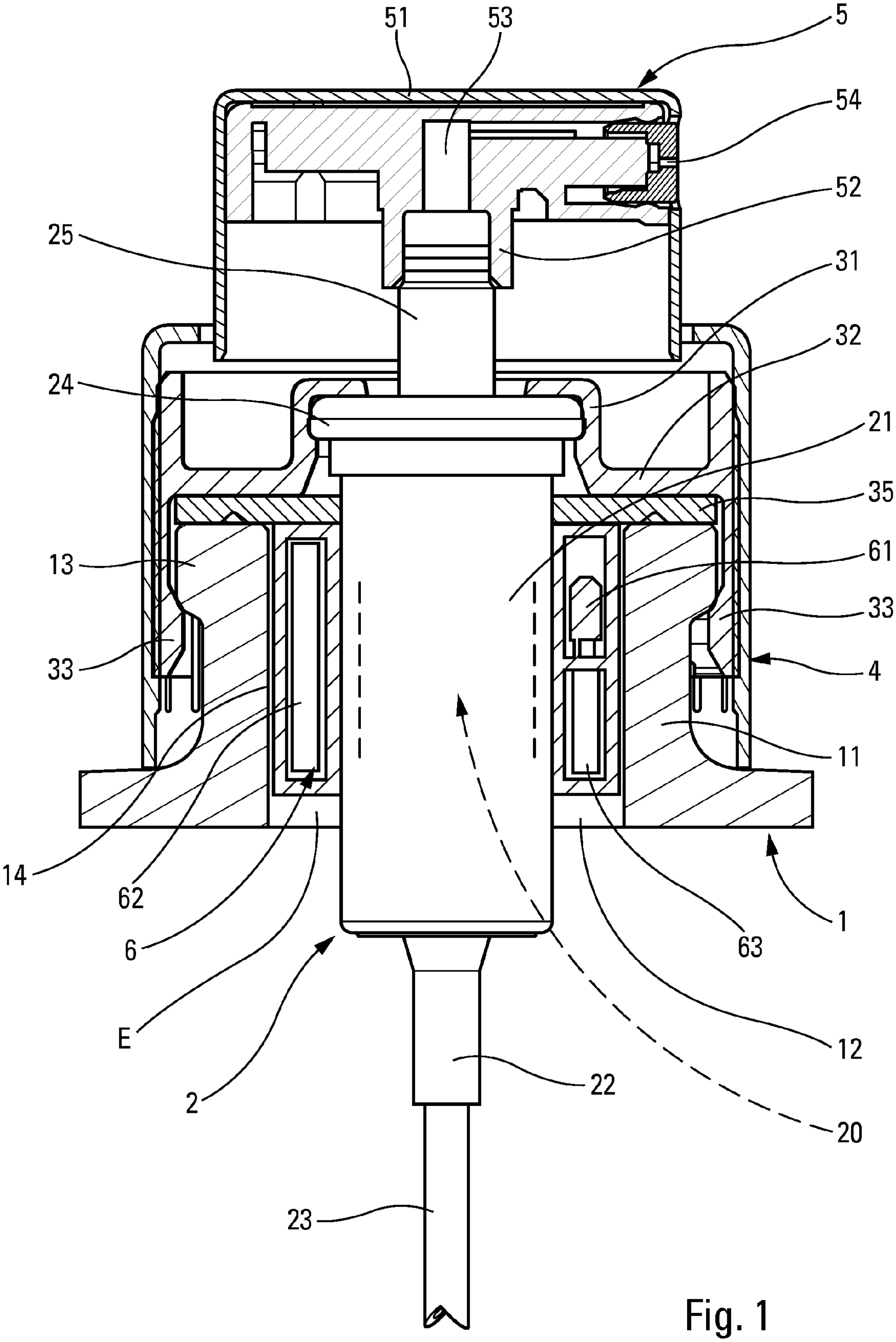
FIG. 1 is a vertical section view through a fluid dispenser in a first embodiment of the invention.
Figure 2:
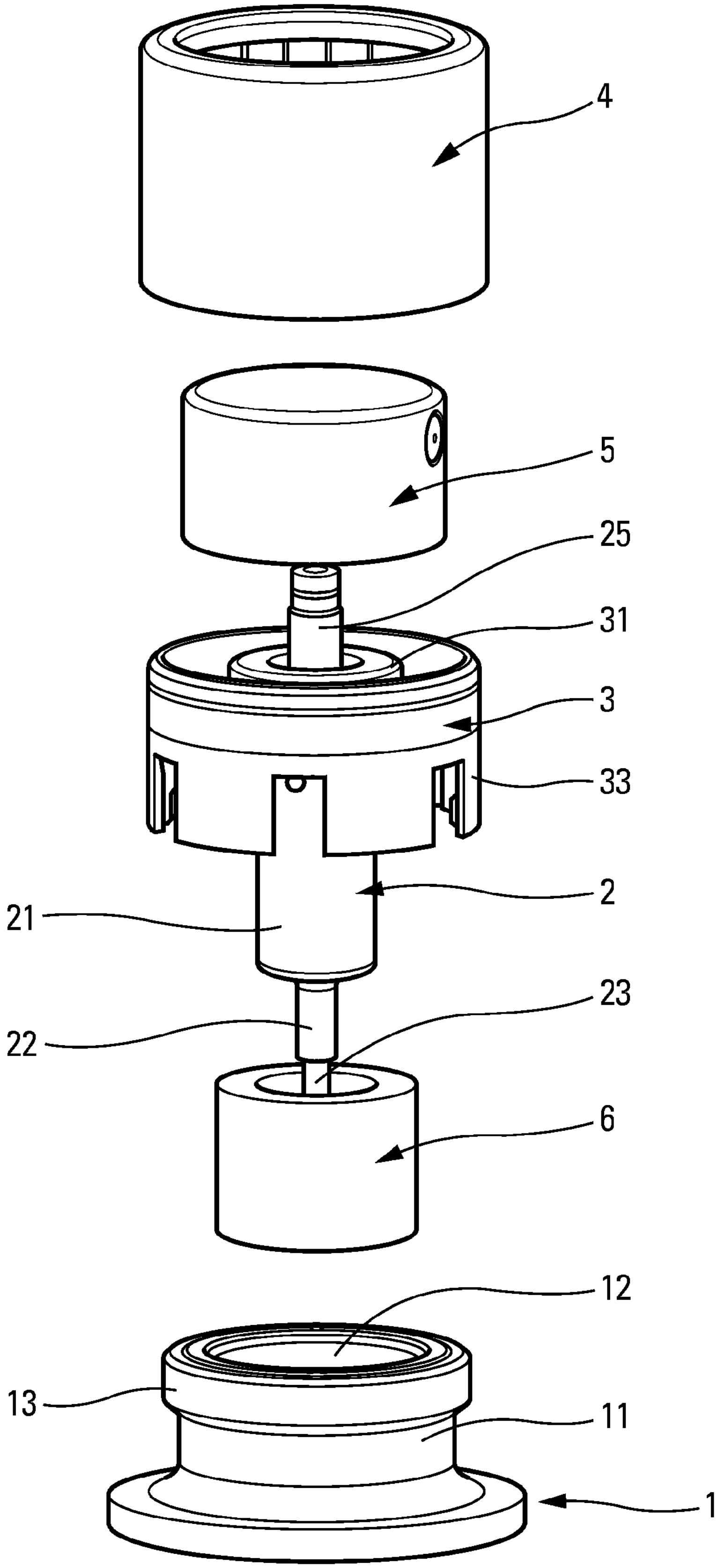
FIG. 2 is an exploded view of the FIG. 1 dispenser.

In the three embodiments shown in FIGS. 1 to 4, the dispenser comprises the following component elements, namely: a reservoir 1; a dispenser member 2; fastener means 3, 4; a pusher 5; and a sleeve 6, 6' and 6", respectively. The three embodiments differ mainly by the sleeve, the other component elements optionally being identical or similar.

The container 1 has a neck 11 defining an opening 12 via which the inside of the container communicates with the outside. Furthermore, the neck forms a projecting peripheral reinforcement 13 and a generally cylindrical inside wall 14 that defines the opening 12. The reinforcement 13 serves to fasten the dispenser member 2, as described below. Some or all of the container may be transparent or translucent.

The present invention applies to all kinds of dispenser member, such as pumps or valves. Consequently, the dispenser member 2 shown in the figures may be either a pump or a valve. The dispenser member 2 includes a body 21 defining an inlet 22 to which a dip tube 23 may be connected, and which extends inside the container 1 down to its bottom wall. At its end remote from the inlet 22, the body 21 includes an outwardly-projecting rim 24. The dispenser member also comprises an actuator rod 25 that is movable downwards and upwards inside the body 21 that forms a fluid chamber 20. The actuator rod 25 drives an element (not shown), which may be a piston for a pump, or a valve member for a valve, and which has the purpose of causing the volume of the fluid chamber 20 to vary. Between two actuations of the rod 25, the chamber 20 is full of fluid.

The body 21 of the dispenser member 2 extends inside the neck 11 in such a manner as to define between them a substantially cylindrical annular gap E that is defined by the inside wall 14 of the neck and the outside wall of the body 21. In its top portion, the annular gap E is defined by the neck gasket 35, and in its bottom portion, is open in such a manner as to communicate directly with the inside of the reservoir. Conventionally, the cylindrical annular gap E has no particular function and remains empty.

The pusher 5 is mounted on the top end of the actuator rod 25. In the embodiment shown, the pusher 5 forms a bearing surface 51, a connection tube 52 that is engaged on the rod 25, and an internal duct 53 that connects a dispenser orifice 54, e.g. in the form of a nozzle.

The operation of such a dispenser member is very simple and well known: it suffices to press on the bearing surface 51 of the pusher so as to move the actuator rod 25 in the body 21, thereby dispensing an optionally-measured quantity of fluid through the actuator rod 25 to the dispenser orifice 54.

In this embodiment, the fastener means 3, 4 are in the form of a fastener ring 3 that is associated with a locking hoop 4. The ring 3 forms a reception housing 31 for receiving the rim 24 of the body 21, and also forms a fastener skirt 33 that is engaged around the reinforcement 13 of the neck. The housing is connected to the skirt via an annular disk 32. To achieve a sealed fastening on the neck, the fastener means advantageously include a neck gasket 35 for compressing between the disk 32 and the neck 11. This is a non-limiting embodiment, since the fastener means may also be in the form of a ring for crimping or snap-fastening. The particular form of the fastener means is not critical in the present invention.

This is entirely conventional for a pump or a valve in the fields of cosmetics, perfumery, or even pharmacy.

In the invention, the annular gap E serves to house therein one or more sources of radiation 61 that is/are capable of emitting radiation in a certain direction. The source of radiation 61 may emit in the visible spectrum in such a manner as to constitute a light source. It may also emit in an invisible spectrum. By way of example, the purpose of the radiation from the source is to illuminate, modify, stabilize, sterilize, and/or decontaminate the components and/or the fluid. By way of example, the light source 61 may radiate through the body 21 of the dispenser member in such a manner as to irradiate or illuminate the contents of the fluid chamber 20. Naturally, to do this, it is necessary for the body 21 to be made out of a material that is transparent or translucent to the radiation from the source 61. By way of example, the radiation emitted by the source may have an effect on the fluid stored in the chamber 20: the radiation may modify the properties of the fluid, or may even increase its stability. Alternatively, the radiation emitted by the source 61 may merely have an illumination effect, so as to illuminate the dispenser member. It is also possible to imagine that the source of radiation 61 radiates through the neck 11 of the container, which neck must thus be made out of a material that is transparent or translucent to the radiation from the source. By way of example, illuminating the neck 11 may serve to illuminate the remainder of the container. Provision may also be made for the fastener ring 3 and/or the locking hoop 4 to be made out of a material that is transparent or translucent to the radiation from the source 61. The gasket 35 may also be made out of a material that is transparent or translucent to the radiation from the source, such that the radiation may pass through the gasket 35 and the disk 32 in such a manner as to illuminate at least a fraction of the pusher 5. In other words, the radiation emitted by the source 61 may have the effect of lighting one or more component elements of the dispenser and/or of treating the fluid dispensed by the dispenser.

In a practical embodiment, the source of radiation may be a light-emitting diode 61 with which there are associated a power-supply battery 62 and possibly an electronic control circuit 63. By way of example, the source may be switched on and off by actuating the pusher 5, or even by removing and repositioning a cap that comes to cover the pusher 5 and/or the locking hoop 4. The source of radiation 61, its battery 62, and its electronic circuit 63 may be mounted in the sleeve 6 that advantageously presents a cylindrical configuration. Thus, the sleeve 6 may be engaged in the cylindrical annular gap E, in engagement around the body 21 and/or with the inside wall 14 of the neck 11. The sleeve 6 may also be incorporated with the neck gasket 35. In the embodiment in FIG. 1, the sleeve 6 is force-fitted around the body 21 until it comes into contact with the neck gasket 35. It is thus very easy to mount.

Figure 3:
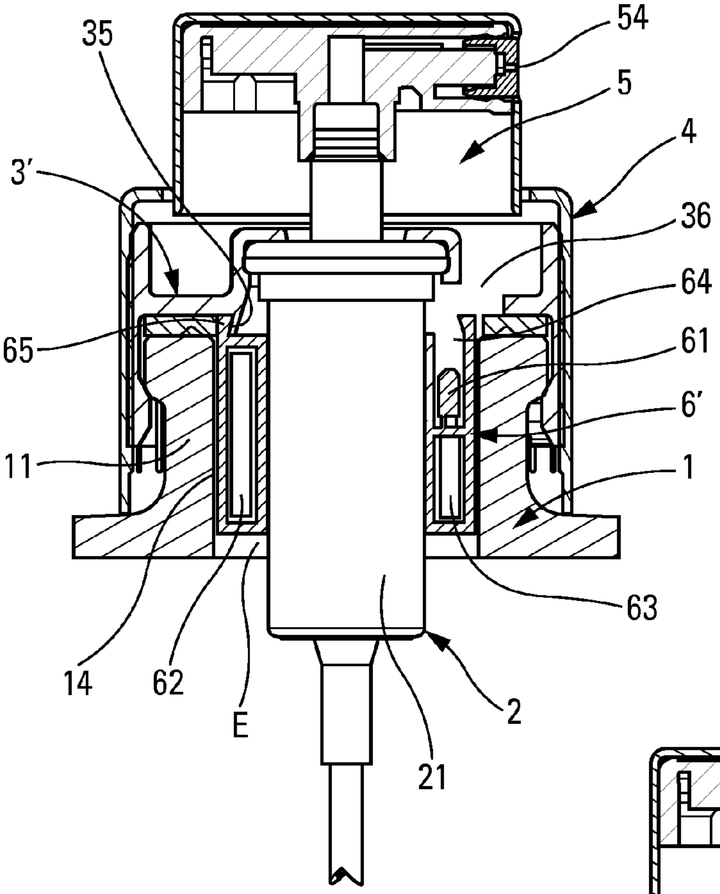
FIG. 3 is a view similar to FIG. 1 showing a second embodiment of the invention.

Reference is made below to FIG. 3, which shows a second embodiment in which the source of radiation 61 is mounted in a sleeve 6' that is secured to the fastener ring 3'. To do this, the ring 3' and the sleeve 6' co-operate with each other to form complementary snap-fastener means 35, 65. Instead of the snap-fastener means, it is also possible to envisage making the sleeve 6' integrally with the fastener ring 3'. It should also be observed that the fastener ring 3' forms a window 36 just above the source of radiation 61 so that the radiation may diffuse freely via the window 36, upwards towards the pusher 5, and more particularly towards the dispenser orifice 54. Thus, the fluid dispensed through the orifice 54, advantageously in the form of spray, may be illuminated by the radiation coming from the source 61. Instead of the window 36, provision may also be made for the fastener ring 3' to be made out of a material that is transparent or translucent to the radiation from the source 61. In this embodiment, the sleeve 6' is disposed in the annular gap E, without engaging either the body 21 or the inside wall 14 of the neck 11.

Figure 4:
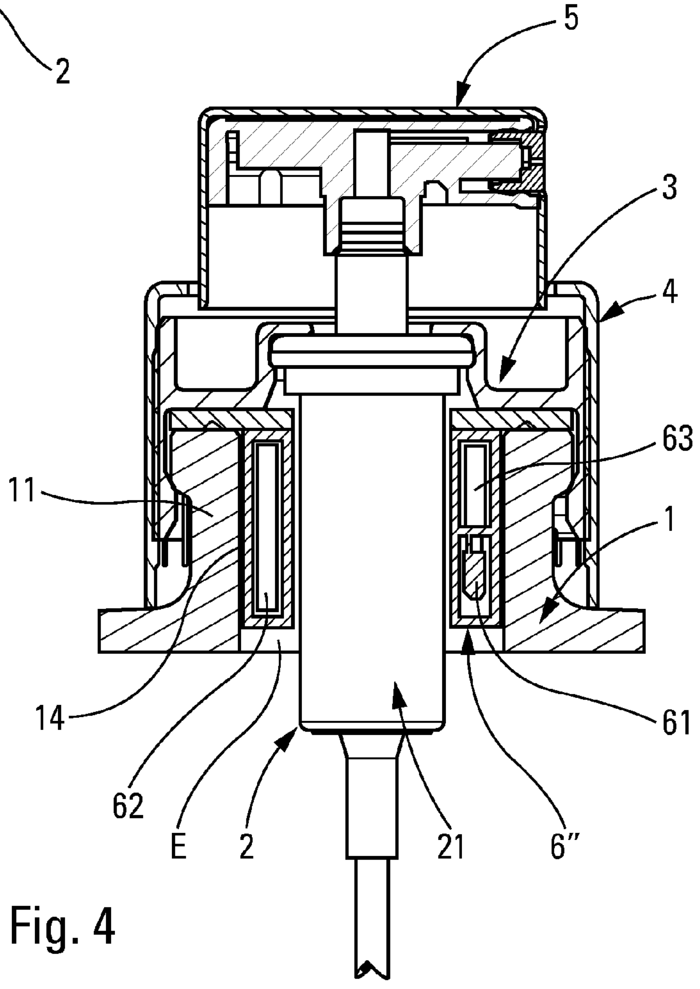
FIG. 4 is a view similar to FIG. 1 showing a third embodiment of the invention.

In FIG. 4, the sleeve 6" engages the inside wall 14 of the neck 11, defining a small gap with the body 21. In this embodiment, the source of radiation 61 is oriented downwards towards the inside of the container, in such a manner as to be able to illuminate its contents. The source 61 may also light the fluid inside the body 21, when said body is made out of a material that is translucent or transparent to the radiation from the source 61.

In all three embodiments, the source(s) of radiation 61 is/are housed in the cylindrical annular gap E that is defined between the body 21 of the dispenser member and the inside wall 14 of the neck 11. Positioning the source of radiation inside the gap E makes it possible to illuminate or to irradiate any portion or location of the dispenser, but without that complicating its design, damaging its appearance, or depriving it of any function.

What is claimed is:

1. A fluid dispenser comprising:

a fluid reservoir including a neck having an inside wall extending along a neck axis and defining an opening; and a dispenser member, including a body that is held in stationary manner in the opening of the reservoir, defining an annular gap between the neck and the body, the annular gap extending along the neck axis between an outside wall of the body and the inside wall of the neck; and at least one source of radiation disposed in the annular gap; and wherein the source of radiation is secured to the body of the dispenser member.

2. A fluid dispenser according to claim 1, wherein the source of radiation is mounted in a sleeve that is engaged in the opening of the neck, around the body of the dispenser member.

3. A fluid dispenser according to claim 2, wherein the fastener means are, at least in part, transparent or translucent to the radiation from the source of radiation.

4. A fluid dispenser according to claim 1, wherein the body of the dispenser member is transparent or translucent to the radiation from the source of radiation, the body defining a fluid chamber that is subjected to the radiation from the source of radiation, through the body.

5. A fluid dispenser according to claim 1, wherein the source of radiation comprises a light-emitting diode that is associated with a power-supply battery.

6. The fluid dispenser according to claim 5, wherein the light-emitting diode is associated with an electronic circuit.

7. A fluid dispenser according to claim 1, wherein the fluid reservoir is, at least in part, transparent or translucent to the radiation from the source of radiation, the source of radiation being oriented to radiate into the container.

8. A fluid dispenser according to claim 1, wherein the neck is, at least in part, transparent or translucent to the radiation from the source of radiation, the source of radiation being oriented towards the neck of the fluid reservoir.

9. A fluid dispenser according to claim 1, wherein the body is, at least in part, transparent or translucent to the radiation from the source of radiation, the source of radiation being oriented towards the body of the dispenser member.

10. A fluid dispenser according to claim 1, wherein the source of radiation is oriented out from the opening.

11. The fluid dispenser according to claim 1, wherein the dispenser member is a pump or a valve.

12. The fluid dispenser according to claim 1, wherein a bottom portion of the annular gap is in direct fluid communication with an inside of the reservoir.

13. A fluid dispenser comprising:

a fluid reservoir including a neck having an inside wall extending along a neck axis and defining an opening; and a dispenser member, including a body that is held in stationary manner in the opening of the reservoir, defining an annular gap between the neck and the body, the annular gap extending along the neck axis between an outside wall of the body and the inside wall of the neck; and at least one source of radiation disposed in the annular gap; and wherein the dispenser member includes fastener means for holding the body in the opening of the reservoir, the source of radiation being secured to the fastener means.

14. The fluid dispenser according to claim 13, wherein the source of radiation is mounted in a sleeve that is engaged in the opening of the neck, around the body of the dispenser member.

15. The fluid dispenser according to claim 13, wherein the body of the dispenser member is transparent or translucent to the radiation from the source of radiation, the body defining a fluid chamber that is subjected to the radiation from the source of radiation, through the body.

16. The fluid dispenser according to claim 13, wherein the source of radiation comprises a light-emitting diode that is associated with a power-supply battery.

17. The fluid dispenser according to claim 13, wherein the fluid reservoir is, at least in part, transparent or translucent to the radiation from the source of radiation, the source of radiation being oriented to radiate into the container.

18. The fluid dispenser according to claim 13, wherein a bottom portion of the annular gap is in direct fluid communication with an inside of the reservoir.

* * * * *